United States Patent
Carlson et al.

(10) Patent No.: US 6,526,434 B1
(45) Date of Patent: Feb. 25, 2003

(54) SYSTEM AND METHOD FOR EFFICIENT TRANSFER OF DATA BLOCKS FROM CLIENT TO SERVER

(75) Inventors: James Vernon Carlson, San Jose, CA (US); Bernard John Lopez, San Jose, CA (US); Ronald Mraz, South Salem, NY (US); David Allan Pease, Redwood Estates, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/382,287

(22) Filed: Aug. 24, 1999

(51) Int. Cl.⁷ ............................................. G06F 158/16
(52) U.S. Cl. ..................... 709/203; 707/10; 707/513; 713/171; 709/200; 709/315
(58) Field of Search ..................... 709/203; 707/10, 707/102; 713/171

(56) References Cited

U.S. PATENT DOCUMENTS

| | | | |
|---|---|---|---|
| 5,448,708 A | | 9/1995 | Ward ........................ 395/200.13 |
| 5,452,259 A | | 9/1995 | McLaury ................. 365/230.05 |
| 5,590,368 A | | 12/1996 | Heeb et al. ................... 395/800 |
| 5,787,300 A | | 7/1998 | Wijaya .................... 395/800.01 |
| 5,797,042 A | | 8/1998 | Gaylord ........................ 395/876 |
| 5,802,546 A | | 9/1998 | Chisholm et al. ............ 711/100 |
| 5,802,591 A | * | 9/1998 | Yachida ........................ 711/151 |
| 5,805,821 A | | 9/1998 | Saxena et al. .......... 395/200.61 |
| 5,890,159 A | * | 3/1999 | Sealby et al. .................. 707/10 |
| 5,970,176 A | * | 10/1999 | Takayama .................... 382/239 |
| 6,081,523 A | * | 6/2000 | Merchant et al. ............ 370/389 |
| 6,122,363 A | * | 9/2000 | Friedlander et al. ......... 370/466 |
| 6,128,668 A | * | 10/2000 | Barber et al. ................ 709/228 |
| 6,151,696 A | * | 11/2000 | Miller et al. ................. 714/748 |
| 6,202,012 B1 | * | 3/2001 | Gile et al. ..................... 307/9.1 |
| 6,237,248 B1 | * | 5/2001 | Mayer ............................ 34/117 |
| 6,275,500 B1 | * | 8/2001 | Callaway et al. ............ 370/346 |
| 6,317,831 B1 | * | 11/2001 | King ............................. 380/223 |
| 6,330,248 B1 | * | 12/2001 | Krishna et al. .............. 370/447 |

FOREIGN PATENT DOCUMENTS

EP 0841626 A1 10/1997 ........... G06F/17/30

OTHER PUBLICATIONS

Network Independent Client/Server Programming Interface, vol. 38, No. 11, Nov. 1995, *IBM Technical Disclosure Bulletin*, pp. 165–171.

R. Mraz et al., "A High Performance Get–Put Interface for ATM Communications", Jan. 1998.

* cited by examiner

*Primary Examiner*—James P. Trammell
*Assistant Examiner*—Firmin Backer
(74) *Attorney, Agent, or Firm*—David A. Hall; Heller, Ehrman, White & McAuliffe; Fleit, Kain, Gibbons, Gutman & Bongini P.L.

(57) ABSTRACT

A system transfers data between a client computer and a server computer over a network, wherein communications are established over a first data link between the client and the server to provide the server with identification of the data to be transferred, then communications are established over a second data link between the client and the server for data transfer such that the second data link has a faster data transfer rate than the first data link, then the identified data is transferred from the client to the server; and then finally the client computer is provided with status information relating to the transfer of the identified data. The first data link is sufficient to support normal data operations utilizing existing network resources. The second data link can connect the clients to one or more of the servers, or may connect only particular clients and servers with special needs for large data transfer. The system provides efficient transfer of large data blocks from clients to servers over the network, without disruption to normal data operations and without a requirement for extensive and expensive resource upgrades or cumbersome and inconvenient archive methodologies.

35 Claims, 3 Drawing Sheets

SYSTEM AND METHOD FOR EFFICIENT TRANSFER OF DATA BLOCKS FROM CLIENT TO SERVER

BACKGROUND OF THE INVENTION

1. Field of the Invention

This invention relates generally to network computer systems and, more particularly, to efficient transfer of data from client computers to server computers.

2. Description of the Related Art

Most computer networks include one or more server computers, which are a source and repository for large blocks of data, and multiple client computers, which communicate with the servers, operate on smaller blocks of data, and transfer the edited data back to the servers. The server computers typically are capable of storing large amounts of data, on the order of 100 gigabytes (GB) or more at each server. Such storage can be achieved with a variety of data storage systems, including large magnetic and magneto-optical disk libraries and magnetic tape libraries. In most computer databases, the data is organized into tables. A master copy of all the tables is distributed over one or more of the servers, while designated rows and columns, or subtables, of the database are copied to clients and modified before being returned to their respective server. This scheme permits the servers to exercise version control over the subtables extracted from the database and to manage the sequence and priority of data modifications by the clients.

The size of the data blocks handled by the client computers may be many megabytes (MB) of data. While a user at a client computer modifies and updates a block of data, the change commands themselves or the data block changes may be sent back and forth many times between the client and the server. Many database systems comprise a relational database management system (RDBMS) in which the data is organized according to table relations and application programs manage document version control, user access, and other network and document management issues. An example of such a system is the "ADSTAR Distributed Storage Manager" system (ADSM) by International Business Machines Corporation (IBM Corporation).

An RDBMS typically incorporates periodic backup operations in which database tables are copied from the client computers to the servers. Backup operations are important for ensuring reliable data recovery of critical data, should that need arise. A backup operation may transfer not only updated database tables, but also information that largely duplicates a sequence of data changes or transactions that were executed at a client computer. This type of backup system implements an insulated server and can involve the transfer of very large blocks of data. During an insulated-server backup session, for example, 100 GB of data may be transferred from a client to a server. Thus, there may be a need to reliably transfer large blocks of data between the servers and the clients. Even at network data transfer rates of 10 MB/sec or more, it is not unusual for a backup session to require several hours for completion, due to the volume of network traffic that must be accommodated.

Because a client computer cannot reliably perform other operations while the backup operation is proceeding, a client is usually taken off-line during backup and therefore is not available to a user for normal or typical data operations. As a result, most backup operations are performed during evening or late night hours when most users have no need for on-line access and are not engaged in any data operations. This scheduling minimizes the impact of backup operations on the computer system and causes the least disruption to continuing data operations. Increasing workloads, however, have left less off-peak time available for backup operations, and database complexity has increased the amount of data that must be transferred during backup operations. Moreover, many computer systems have a need for 24-hour availability of on-line data operations. For example, airline reservation systems, financial institutions, and municipal services may need virtually 24-hour availability. These circumstances can severely tax the capability of the computer network to accommodate the volume of data traffic that is occurring. Such operational needs place ever greater demands on the communications infrastructure of a computer network.

One way of providing the necessary infrastructure to accommodate the transfer of large data blocks during backup operations is to upgrade all computer network communications links between client computers and server computers for all traffic conditions. Thus, all the communications links will be able to accommodate data traffic during normal operations and also during backup operations. Unfortunately, this upgrade approach may be costly and time consuming. It may not be practical if the existing network infrastructure cannot be upgraded without extensive delays for cabling and resource improvements due to distance, technological, and physical constraints. In addition, the extensive network-wide upgrades may be triggered by only a few isolated bottlenecks for large network data transfers, requiring expensive efforts and expenditures to rectify isolated problems.

Another way of handling transfers of large data blocks for backup is to off-load the transfers to disk or tape archives. When data from the archives is needed, the appropriate disks or tapes can be manually loaded onto storage drives and the data can be accessed. This off-load procedure may be useful, but does not permit immediate and 24-hour access to the data. In addition, the logistics of keeping a library of archive media, maintaining an archive log, replicating the data, and transporting the archives may be prohibitive.

Yet another solution is to provide distributed data holding areas on the network for temporary holding of bulk data transfers. The holding areas can be used to cache data blocks near the client computers and hold the data blocks until they can be sent through the network to the server computers when other network traffic is reduced. Under this scheme, however, the data again would not be immediately available to the server, preventing 24-hour operation. In addition, the cost of providing the holding areas could be prohibitive.

From the discussion above, it should be apparent that there is a need for efficient transfer of large data blocks from client computers to server computers over a network, without disruption to normal data operations and without a requirement for extensive and expensive resource upgrades or cumbersome and inconvenient archive methodologies. The present invention fulfills this need.

SUMMARY OF THE INVENTION

The present invention provides a system and method that transfers data between a client computer and a server computer over a network, wherein communications are established over a first data link between the client and the server to provide the server with identification of the data to be transferred, then communications are established over a second data link between the client and the server for data transfer, such that the second data link has a faster data transfer rate than the first data link, then the identified data is transferred from the client to the server, and then finally the client computer is provided with status information relating to the transfer of the identified data. The first data link is sufficient to support normal data operations utilizing existing network resources. The second data link can connect the clients to one or more of the servers, or may connect only particular clients and servers with special needs for large data transfer. The system provides efficient transfer of large data blocks from clients to servers over the network, without disruption to normal data operations and without a requirement for extensive and expensive resource upgrades or cumbersome and inconvenient archive methodologies.

In one aspect of the invention, both client and server have the capability of communicating over first and second data links, the first data link being used for normal network traffic and setting communications parameters, and the second data link being used for high speed, bulk data transfers like those involved in backup operations. Selecting between the two links is the responsibility of the client computer. Any two client and server computers that will perform data transfer in accordance with the invention must share the capability of selecting alternate communication links. The server may schedule bulk data transfers, but the actual transfer of backup data occurs under supervision of the client. This minimizes the disruption to normal client workload due to the backup operations.

In another aspect of the invention, before transfer of data begins, the client provides the server with metadata that specifies the data and provides associated client identity and authorization, destination file information, and data size. The metadata also permits optional performance enhancements, such as optional data compression processing prior to data transfer.

Other features and advantages of the present invention should be apparent from the following description of the preferred embodiment, which illustrates, by way of example, the principles of the invention.

DESCRIPTION OF THE PREFERRED EMBODIMENT

Figure 1:
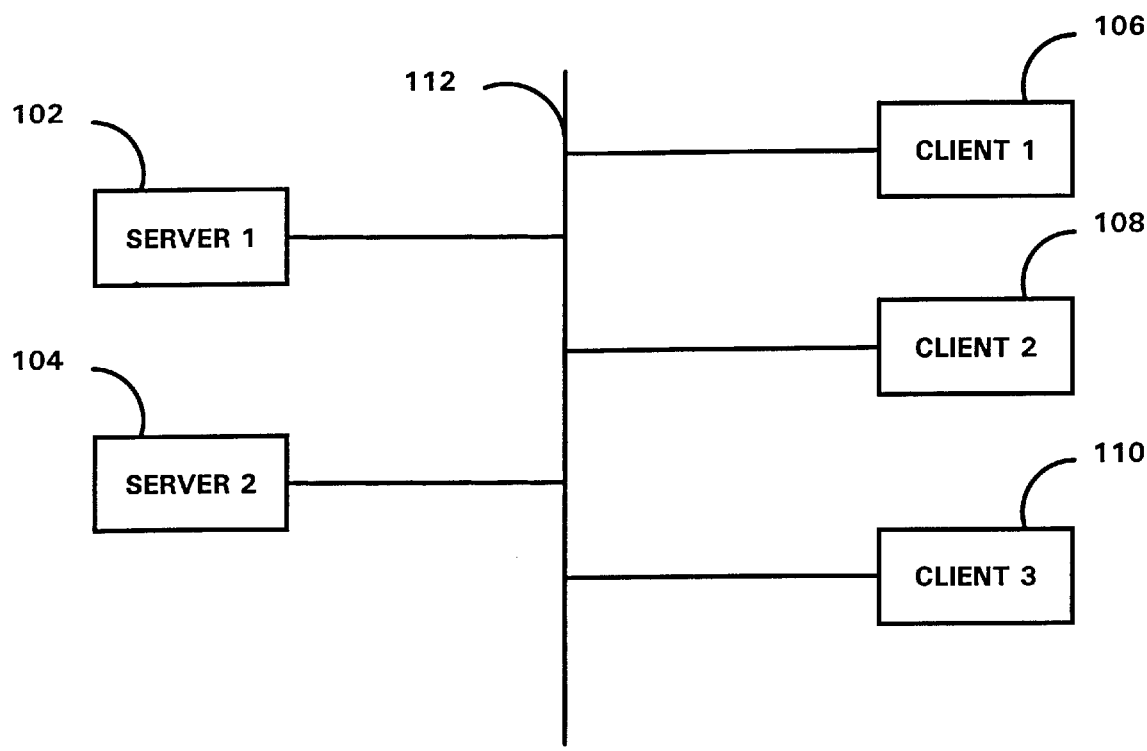
FIG. 1 is an illustration of a computer system constructed in accordance with the present invention, showing the computer system with server computers and client computers connected over a network.

FIG. 1 shows a computer system 100 constructed in accordance with the present invention. The system includes one or more server computers 102, 104 that communicate with multiple client computers 106, 108, 110 over a network 112. In the preferred embodiment, the computer system implements a relational database management system (RDBMS) in which relational data tables are stored at the servers 102, 104 and portions of those tables are copied to and modified at one or more of the clients 106, 108, 110. In accordance with common RDBMS practice, a backup operation is periodically performed so the modified data tables at the clients can be copied back to the servers. This may provide for example, transaction log maintenance and data redundancy.

Figure 2:
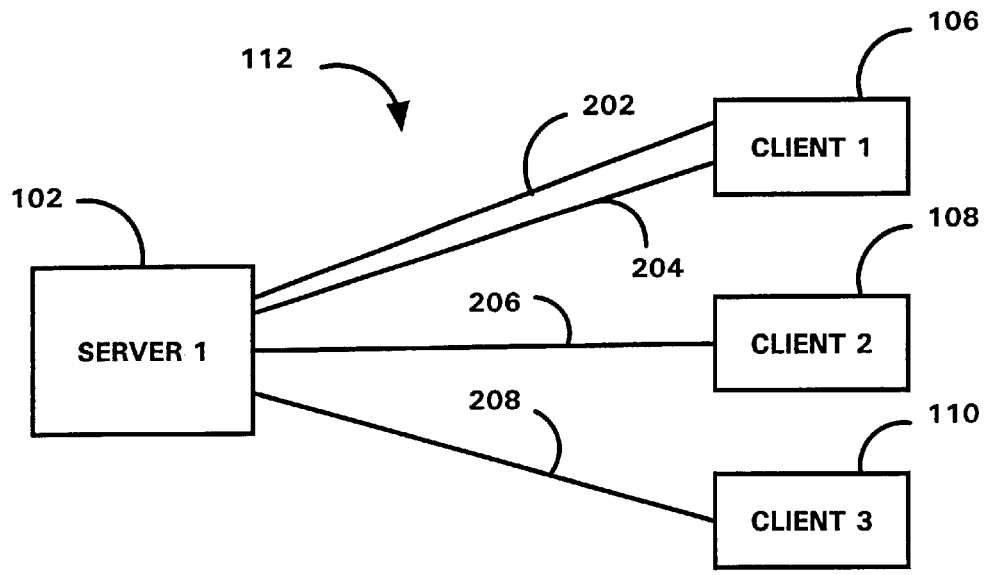
FIG. 2 is an illustration of communication links between one of the server computers illustrated in FIG. 1 and the client computers.

FIG. 2 shows the network communications links between one of the server computers 102 and the client computers 106, 108, 110. The first client 106 performs critical data modifications, and therefore has a need for continuous 24-hour availability. Therefore, the first client is connected to the server 102 with two separate links, a network data link 202 and a relatively high-speed dual or secondary link 204 that is capable of data transfer at rates much greater than those of the network data link. The second client 108 and third client 110 do not require continuous availability and are connected to the server 102 only with respective links 206, 208 having the same specification as the first network data link 202.

In accordance with the invention, the first client 106 uses the network data link 202 for conventional data communications and uses the high-speed dual link 204 only for transmission of data during backup operations. The network data links 202, 206, 208 may comprise, for example, Ethernet or token-ring networks using a TCP/IP protocol and supporting data transfer rates of 10 MB/sec to 100 MB/sec. The high-speed dual link 204 may comprise a high-speed communication line such as a T1 or Digital Subscriber Line (DSL), and preferably uses protocols such as the IBM Corporation "Get-Put" interface or the "Via" protocol. Thus, the dual link 204 supports data transfer at the fastest conventional speeds, typically data transfer rates of 155 MB/sec to 2.5 GB/sec. For example, the Get-Put interface supports block transfers of data and point to point network communications. Even higher speeds may be supported.

It should be noted that the paired first and second communication links 202, 204 between client and server exist not only in hardware, but also in software, in that the RDBMS of the system 100 must support selection from at least two alternate data paths between client and server for those nodes that are enabled for such paired communication links. As described further below, the RDBMS application at each of those network nodes must provide the capability to change from one link to the other, whether that node is a client or a server. The modification to conventional RDBMS applications necessary to support such capability will depend on the particular structure and operation of such RDBMS systems, and will be apparent to those skilled in the art. Such modifications should be apparent to those skilled in the art. For example, the exemplary system of FIG. 1 implements the IBM Corporation "ADSTAR Distributed Storage Manager" (ADSM) system. To support the transfer of backup data in accordance with the invention, the conventional ADSM system is modified to permit selection between alternate communication paths.

The RDBMS backup procedure in accordance with the invention is to first establish network communications between the server 102 and the client 106 over the network data link 202 to provide the server with authorization information and identification of the data to be transferred. Next, communications are established between the client 102 and the server 106 over the second, high-speed dual link 204 to permit fast data transfer over the dual link, which has a faster data transfer rate than the first data link 202. Following server authorization to use the dual link 204, the identified data is transferred from the client 106 to the server 102 over the dual link in the RDBMS backup operation. At the conclusion of the backup operation, status information relating to the high speed transfer of the identified data is provided from the server to the client over the first network data link 202.

The network data link 202 is sufficient to support normal data operations utilizing existing network resources. Thus, the network data links 202, 206, 208 may comprise existing communication links such as might be found in conventional networks. Communication links of the second type 204 can be provided in a variety of ways, including high-speed wire or optical cable and satellite or ground-based radio frequency links. Thus, links of the second type can be added to existing systems with minimal expenditures on infrastructure.

It should be noted that the high-speed dual link 204 can connect all clients to one or more of the servers, or may connect only particular clients and servers with special needs for large data transfer and continuous availability. In the illustrated example of FIG. 2, only the first client 106 has a need for large data transfer and continuous on-line availability, and therefore only the first client is connected to the server with two links 202, 204. In this way, the system 100 provides efficient transfer of large data blocks from clients to servers over the network 112, without disruption to normal data operations and without a requirement for extensive and expensive resource upgrades or cumbersome and inconvenient archive methodologies.

Figure 3:
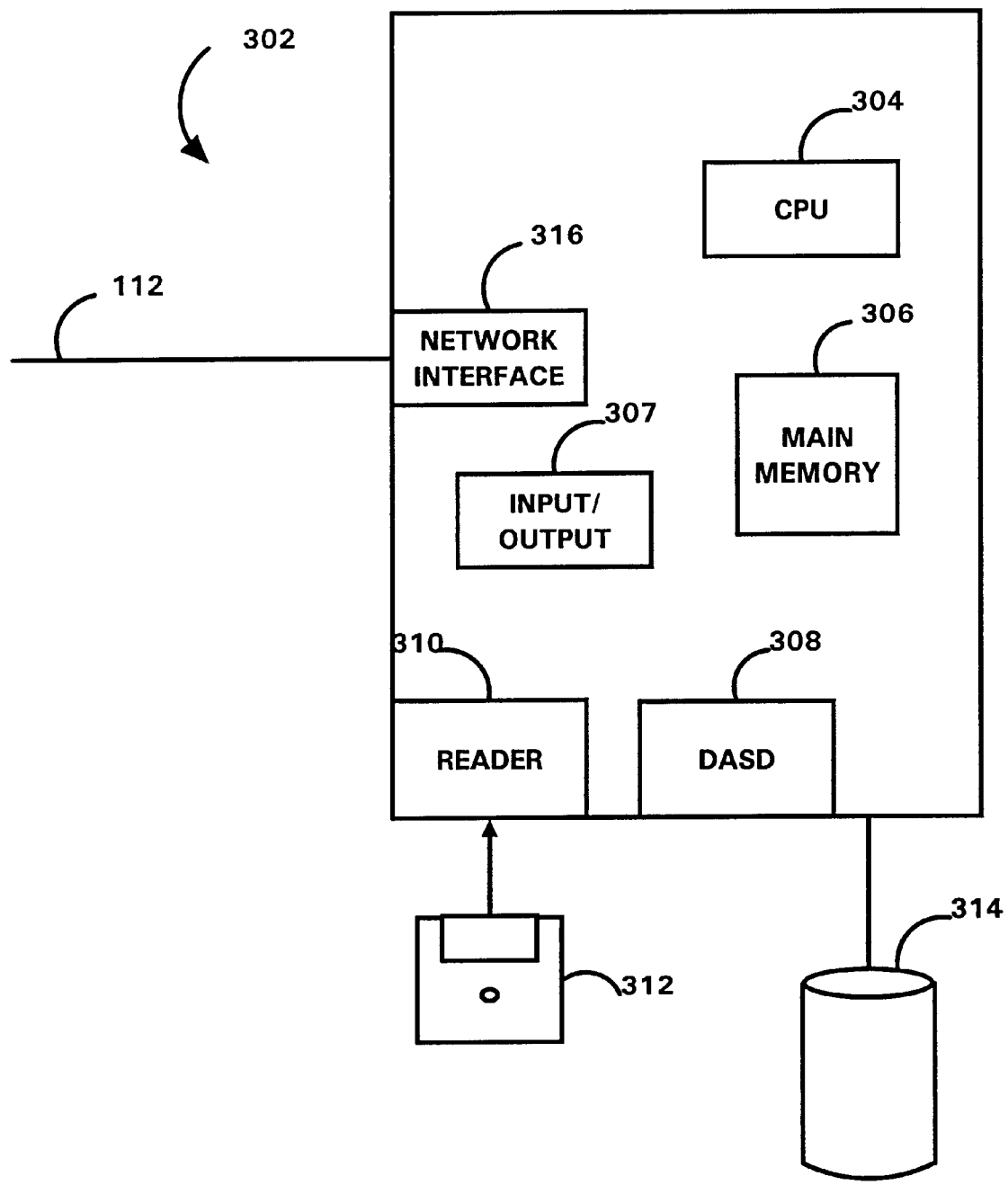
FIG. 3 is a block diagram representation of a computer at a node of the network illustrated in FIG. 1.

FIG. 3 is a block diagram representation of a computer 302 at a node of the network system 100 illustrated in FIG. 1. The computer can be either a client or server. Each of the computers 102, 104, 106, 108, 110 illustrated in FIG. 1 has a construction similar to the computer 302 illustrated in FIG. 3, so that details described with respect to the FIG. 3 computer will be understood to apply to all computers of the system 100.

Each computer 302 includes a central processing unit (CPU) 304, an operating main memory 306, input/output devices 307 such as a keyboard and display, and a direct access storage device (DASD) 308, such as a hard disk drive. The main memory typically comprises volatile semiconductor random access memory (RAM). Each computer 302 preferably includes a program product reader 310 that accepts a program product storage device 312, from which the program product reader can read data (and to which it can optionally write data). The program product reader 310 can comprise, for example, a disk drive and the program product 312 can comprise removable media such as a magnetic floppy disk, CD-R disk, or CD-RW disk.

The computers that are servers 102, 104 may also include a mass storage unit 314 suitable for large-scale bulk data storage, such as magnetic tape, magnetic disk, magneto-optical disk, or similar storage systems. The mass storage unit may be installed as single drives or grouped into libraries of media drives. The data tables of the RDBMS are preferably maintained in the mass storage unit 314 of the servers and are accessed by the clients. Each computer of the system communicates with the others via the network 112 through a network interface 316, and thereby comprises a network node. The network interface preferably supports communication over both communication links 202, 204 if they are available.

Each computer 302 performs its functions by executing instructions stored in program storage of the main memory 306. When the program storage instructions are executed, the RDBMS performs its functions. The instructions can be received from the DASD 308, through the program product storage device 310, or through the network interface 316. The storage drive 310 can receive a program product storage device 312, read program steps recorded on the program product storage device, and transfer the program steps into the main memory 306. As noted above, the program product storage device can comprise any one of multiple removable media having computer-readable instructions, including floppy disks and CD storage. Other suitable program product storage devices can include magnetic tape and semiconductor memory. In this way, the processing steps necessary for operation in accordance with the invention can be embodied on a program product. Alternatively, the program steps can be received into the operating memory 308 over the network 112. In the latter method, the computer receives data into the main memory 306 through the network interface 316 after network communication has been established by well-known methods that will be understood by those skilled in the art without further explanation.

As noted above, data tables of the RDBMS are stored mass data storage units 314 at the servers, and are accessed by computer users at clients, through an application program executing in program memory 306 that provides an RDBMS interface. In the preferred embodiment, the servers 102, 104 maintain master data tables in the mass data storage unit 314, whereas the clients 106, 108, 110 receive local copies of selected portions of those master data tables over the network 112 and modify them in their local DASD 308. Periodic backup operations of the RDBMS collect client changes and transmit them back over the network to the with the master data tables server.

Figure 4:
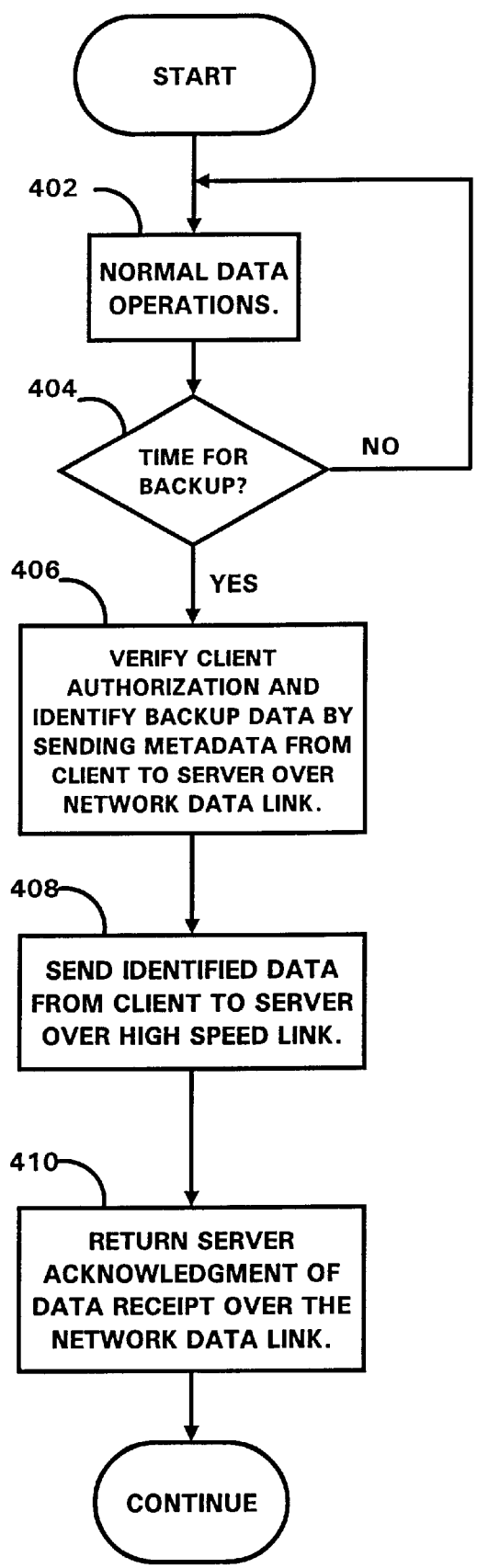
FIG. 4 is a flow diagram that illustrates the processing steps executed by the computer system of FIG. 1 to perform operations in accordance with the present invention.

FIG. 4 is a flow diagram that illustrates the processing steps executed by the computer system of FIG. 1 to perform operations in accordance with the present invention. As noted above, the exemplary system of FIG. 1 provides an RDBMS that performs periodic backup operations that transfer large blocks of data from clients to servers. During typical data operations, represented by the FIG. 4 flow diagram box numbered 402, the clients perform data operations such as table editing and processing RDBMS transactions entered by system users. So long as it is not time for a backup operation, indicated by a negative outcome at the decision box numbered 404, system processing continues with normal data operations at the clients and servers. Thus, processing flows from the negative outcome at the decision box 404 back to the flow diagram box numbered 402 where more data operations are performed. Eventually, the system determines that a backup operation should be performed, indicated by a positive outcome at the decision box numbered 404.

The backup determination may be the result of the RDBMS application in the servers performing a scheduling function, or it may be the result of the RDBMS application in the clients performing a similar function, or it may be a combination of both. For example, at the expiration of a predetermined period, a server may schedule backup operations from several clients or from all clients that received data tables from the server since the last backup operation. This permits the system to assess workload and fully utilize the high-speed dual link. Such processing is part of the box 404 processing.

When a backup operation is called for, an affirmative outcome at the decision box 404, system processing moves to the operation represented by the flow diagram box numbered 406, which indicates that metadata is sent from a client to a server over the network data link. As noted above, in a conventional data processing system, the network data link is the only link between clients and servers for all network data exchange, including commands, status information, and data. In this step 406, the data to be sent by the client during the RDBMS backup operation is identified by means of the client sending the server data that identifies the backup data and the originating client. Such data is commonly referred to as metadata.

The metadata that is sent to the server is sufficient to identify the table information that will be sent, including information such as filename, row and column location, time of last update, source table name, size of the update, and the like. For example, the metadata of step 406 may identify the data that was most recently transferred to the server, and the RDBMS may then schedule for transfer only data that is more recently changed. The metadata also typically includes information that permits authentication of the sending client's authority to perform the data transfer operation for the identified data. The metadata that is sent by a client will be determined by the particular application that is performing the backup operation at the client.

The client may optionally decide to perform data compression on the backup data that will be sent. If so, the determination will be made by the client, which will also be responsible for performing the compression. The metadata sent to the server will typically indicate whether the backup data has been compressed, and will include any information that might be needed to enable decompression by the receiving server. The metadata sent in step 406 also may include a verification of the server's capability for performing the dual link data transfer. If no verification is received, then no transfer using the dual link is attempted.

The metadata generated by the processing of box 406 also will identify the particular client node that will be sending the data backup information, and will identify the particular server that will be receiving the data backup information. Thus, in the illustrated embodiment, the backup operation will occur between a particular client and a particular server, and the participants in this operation will be identified in the metadata. It should be understood, however, that the invention also has application to computer systems in which backup operations are not performed in a point-to-point manner.

After the client sends the metadata to the server, the next processing step is for communications over the dual link to be established and for the backup data to be sent from the specified client to the appropriate server using the dual link having the high data transfer rate. This processing step is represented by the flow diagram box numbered 408. After the server receives the backup data, the server returns an acknowledgment of the data receipt to the sending client, as indicated by the flow diagram box numbered 410. This completes the backup operation, and afterwards the normal data operations of the system may continue.

As noted above, the exemplary system implements the IBM Corporation "ADSTAR Distributed Storage Manager" (ADSM) system. The ADSM system has several features that make it advantageous for implementing the invention. For example, the authentication process of box 406 may include verification with the "capability" function of ADSM, with which client and server can verify that they both support data transfer over the network data link and the second dual link. This ensures that a computer that can only communicate over the network data link does not attempt data backup operations with a dual link-enabled computer.

Moreover, to implement the transfer of backup data as identified in the FIG. 4 flow diagram boxes 406, 408, and 410, the ADSM system utilizes data transfer over high-speed lines such as DSL or Asynchronous Transfer Mode (ATM) lines, and utilizes a protocol called the "Get-Put" protocol. It should be understood that other protocols may be suitable, but the Get-Put protocol is advantageous in that it supports a pipelined (queued) operations that permit more fully utilizing the dual link and also permits point-to-point transfer of data between a particular client and a particular server. A point-to-point data transfer reduces the data overhead to implement client-server use of two independent data links for data transfer and helps ensure reliable transfer of the metadata over the network data link and of the backup data over the high-speed dual link.

More particularly, the processing of the flow diagram box numbered 408 regarding transfer of the backup data from client to server is performed in what is known as a Get-Put protocol scheme by the server sending a "Get" instruction to the client identified in the received metadata (step 406). After the client receives the Get instruction, the client generates a "Put" instruction and transmits the backup data to the server identified in the metadata. The Get instruction and the Put instruction, as well as the backup data, are sent to the server over the high speed dual link. It should be understood that other schemes are possible, such as sending the Get instruction itself over the network data link and sending only the actual backup data over the high-speed dual link, so long as such other schemes utilize the high-speed link for the actual backup data, and the client and server are in agreement over which links will be used for which information.

Thus, the present invention provides a system that transfers data between a client computer and a server computer over a network, wherein communications are established over a first data link between the client and the server to provide the server with identification of the data to be transferred, then communications are established over a second data link between the client and the server for data transfer such that the second data link has a faster data transfer rate than the first data link, then the identified data is transferred from the client to the server; and then finally the client computer is provided with status information relating to the transfer of the identified data. The first data link is sufficient to support normal data operations utilizing existing network resources. The second data link can connect the clients to one or more of the servers, or may connect only particular clients and servers with special needs for large data transfer. The system provides efficient transfer of large data blocks from clients to servers over the network, without disruption to normal data operations and without a requirement for extensive and expensive resource upgrades or cumbersome and inconvenient archive methodologies.

The present invention has been described above in terms of a presently preferred embodiment so that an understanding of the present invention can be conveyed. There are, however, many configurations for client-server computer systems not specifically described herein but with which the present invention is applicable. The present invention should therefore not be seen as limited to the particular embodiments described herein, but rather, it should be understood that the present invention has wide applicability with respect to client-server computer systems generally. All modifications, variations, or equivalent arrangements and implementations that are within the scope of the attached claims should therefore be considered within the scope of the invention.

We claim:

1. A method of transferring data between a client and a server of a computer network, the method comprising:

communicating over a first network data link between the client and the server, and providing the server with metadata that identifies the data to be transferred;

communicating over a dual data link between the client and the server, the dual data link having a faster data transfer rate than the network data link, and transferring the identified data from the client to the server; and communicating over the network data link and providing the client with status information relating to the transfer of the identified data.

2. A method as defined in claim 1, wherein the step of identifying the data to be transferred further comprises authenticating the authorization of the client to send and receive data from the server.

3. A method as defined in claim 1, wherein the step of identifying the data to be transferred further comprises verifying the capability for the client to utilize the dual data link for the data transfer.

4. A method as defined in claim 1, wherein the step of identifying the data to be transferred further comprises determining the data that was most recently transferred to the server, and identifying for transfer only data that is more recent than data at the server.

5. A method as defined in claim 1, wherein the step of communicating over the dual data link comprises a point-to-point network communication.

6. A method as defined in claim 1, further including the step of performing a data compression process on the data prior to providing the server with metadata that identifies the data to be transferred.

7. A method as defined in claim 6, wherein the metadata indicates whether the identified data has been compressed.

8. A computer data system comprising:
   at least one client computer at which data editing operations are performed;
   at least one server computer that periodically receives edited data from the client computer and places the edited data in storage;
   a network data link between the client computer and the server computer that supports data transfer between the client computer and the server computer;
   a dual data link between the client computer and the server computer that supports data transfer between the client computer and the server computer, the dual data link having a faster data transfer rate than the network data link;
wherein the client computer communicates with the server computer over the network data link to provide the server with metadata that identifies the data to be transferred, and then transfers the identified data to the server computer over the dual data link, and wherein the server computer communicates over the network data link and provides the client computer with status information relating to the transfer of the identified data.

9. A computer data system as defined in claim 8, wherein the metadata provided by the client computer includes data that authenticates the authorization of the client computer to send and receive data from the server computer.

10. A computer data system as defined in claim 8, wherein the metadata provided by the client computer includes data that verifies the capability for the client to utilize the dual data link for the data transfer.

11. A computer data system as defined in claim 8, wherein the metadata provided by the client computer includes data that determines the data most recently transferred to the server, and identifies for transfer only data that is more recent than the data at the server.

12. A computer data system as defined in claim 8, wherein the dual data link comprises a point-to-point network communication link.

13. A computer data system as defined in claim 8, wherein the client computer performs a data compression process on the data prior to providing the server with metadata that identifies the data to be transferred.

14. A computer data system as defined in claim 13, wherein the metadata indicates whether the identified data has been compressed.

15. A client computer comprising:
   a network interface that permits transfer of data between the client computer and a server computer over a network data link between the client computer and the server computer, and also permits transfer of data between the client computer and the server computer over a dual data link having a data transfer rate faster than that of the network data link; and
   a data application that permits the client computer to perform data editing operations and to periodically transfer data to the server computer;
   wherein the client computer communicates with the server computer over the network data link to provide the server with metadata that identifies the data to be transferred, and then transfers the identified data to the server computer over the dual data link, and wherein the server computer communicates over the network data link and provides the client computer with status information relating to the transfer of the identified data.

16. A client computer as defined in claim 15, wherein the metadata provided by the client computer includes data that authenticates an authorization of the client computer to send and receive data from the server computer.

17. A client computer as defined in claim 15, wherein the metadata provided by the client computer includes data that verifies a capability for the client to utilize the dual link for the data transfer.

18. A client computer as defined in claim 15, wherein the metadata provided by the client computer includes data that determines the data most recently transferred to the server, and identifies for transfer only data that is more recent than the data at the server.

19. A client computer as defined in claim 15, wherein the dual data link comprises a point-to-point network communication link.

20. A client computer as defined in claim 15, wherein the client computer performs a data compression process on the data prior to providing the server with metadata that identifies the data to be transferred.

21. A client computer as defined in claim 20, wherein the metadata indicates whether the identified data has been compressed.

22. A server computer comprising:
   a network interface that permits transfer of data between the client computer and a server computer over a network data link between the client computer and the server computer, and also permits transfer of data between the client computer and the server computer over a dual data link having a data transfer rate faster than that of the network data link; and
   a data application that permits the server computer to receive edited data from the client and to periodically receive transferred data from the client computer;
   wherein the client computer communicates with the server computer over the network data link to provide the server with metadata that identifies the data to be transferred, and then transfers the identified data to the server computer over the dual data link, and wherein the server computer communicates over the network data link and provides the client computer with status information relating to the transfer of the identified data.

23. A server computer as defined in claim 22, wherein the metadata provided by the client computer includes data that authenticates an authorization of the client computer to send and receive data from the server computer.

24. A server computer as defined in claim 22, wherein the metadata provided by the client computer includes data that verifies a capability for the client to utilize the dual link for the data transfer.

25. A server computer as defined in claim 22, wherein the metadata provided by the client computer includes data that determines the data most recently transferred to the server, and identifies for transfer only data that is more recent than the data at the server.

26. A server computer as defined in claim 22, wherein the dual data link comprises a point-to-point network communication link.

27. A server computer as defined in claim 22, wherein the client computer performs a data compression process on the data prior to providing the server with metadata that identifies the data to be transferred.

28. A server computer as defined in claim 27, wherein the metadata indicates whether the identified data has been compressed.

29. A program product for use in a computer system that executes program steps recorded in a computer-readable media to perform a method for transferring data between a client and a server of a computer network, the program product comprising:

a recordable media;

a program of computer-readable instructions executable by the computer system to perform method steps comprising:

communicating over a first network data link between the client and the server, and providing the server with metadata that identifies the data to be transferred;

communicating over a dual data link between the client and the server, the dual data link having a faster data transfer rate than the network data link, and transferring the identified data from the client to the server; and communicating over the network data link and providing the client with status information relating to the transfer of the identified data.

30. A program product as defined in claim 29, wherein the step of identifying the data to be transferred further comprises authenticating an authorization of the client computer to send and receive data from the server computer.

31. A program product as defined in claim 29, wherein the step of identifying the data to be transferred further comprises verifying a capability for the client to utilize the dual link for the data transfer.

32. A program product as defined in claim 29, wherein the step of identifying the data to be transferred further comprises determining the data that was most recently transferred to the server, and identifying for transfer only data that is more recent than data at the server.

33. A program product as defined in claim 29, wherein the step of communicating over the dual data link comprises a point-to-point network communication.

34. A program product as defined in claim 29, further comprising the step of performing a data compression process on the data prior to providing the server with metadata that identifies the data to be transferred.

35. A program product as defined in claim 34, wherein the metadata indicates whether the identified data has been compressed.

* * * * *